United States Patent [19]

Edwards

[11] Patent Number: 4,994,131

[45] Date of Patent: Feb. 19, 1991

[54] PROCESS OF PREPARING DECORATIVE MATERIAL UTILIZING TRANSFER PRINT FOILS

[76] Inventor: Homer L. Edwards, 1131 South Gladys Ave., San Gabriel, Calif. 91776

[21] Appl. No.: 546,678

[22] Filed: Jun. 29, 1990

Related U.S. Application Data

[63] Continuation of Ser. No. 290,866, Dec. 28, 1988, abandoned, which is a continuation of Ser. No. 668,316, Nov. 5, 1984, abandoned.

[51] Int. Cl.$^5$ .......................... B44C 1/165; B32B 31/00

[52] U.S. Cl. .......................... 156/233; 156/234; 156/235; 156/241

[58] Field of Search .................. 156/63, 219, 230, 233, 156/234, 235, 239, 240, 241, 249, 264, 289, 297, 300, 344; 40/594, 595; 427/408, 411; 428/14, 39, 40, 41, 45, 78; 446/901

[56] References Cited

U.S. PATENT DOCUMENTS

| | | | |
|---|---|---|---|
| Re. 3,903 | 4/1870 | Harrop | 156/241 |
| 775,747 | 11/1904 | Doberenz | 156/233 |
| 2,033,288 | 3/1936 | Kmicic | 428/14 |
| 2,217,270 | 10/1940 | Gibbs | 434/84 |
| 2,375,177 | 5/1945 | Reese | 156/240 |
| 3,080,270 | 3/1963 | Lorenz | 156/233 |
| 3,458,376 | 7/1969 | Malik | 156/241 |
| 3,589,955 | 6/1971 | Edwards | 156/240 |
| 3,676,248 | 7/1972 | Swartz | 156/241 |
| 3,744,152 | 7/1973 | Crasilneck | 434/84 |
| 4,225,641 | 9/1980 | Yokomizo | 156/233 |
| 4,390,381 | 6/1983 | Lemmeyer | 156/63 |

FOREIGN PATENT DOCUMENTS

| | | | |
|---|---|---|---|
| 1139053 | 6/1957 | France | 434/84 |
| 52-5347 | 12/1977 | Japan | 150/219 |

OTHER PUBLICATIONS

Encyclopedia Britannica Micropaedia, vol. 4, 15 ed. 1980 p. 604.

*Primary Examiner*—Michael W. Ball
*Assistant Examiner*—Louis Falasco
*Attorney, Agent, or Firm*—Edgar W. Averill, Jr.

[57] ABSTRACT

A method or technique of preparing or producing distinctive decorative graphic materials. The method utilizes commercially available transfer print foils which are in the form of a thin film including a thin lamination of metallic material which provides the coloration which can transfer to the product. The areas to which coloration is to be applied are delineated such as by embossing paper or other materials or by drawing or printing the areas. Adhesive is then applied to the delineated areas to which coloration is to be applied, and the adhesive is allowed to dry sufficiently to become tacky. A strip of the transfer print foil is then laid over the delineated areas to which adhesive has been applied and is pressed down manually. The strip is then lifted and the coloration provided by the colored metallic lamination releases and transfers to the delineated areas and is held by the adhesive. Iridescence is produced by applying one color over another.

1 Claim, 4 Drawing Sheets

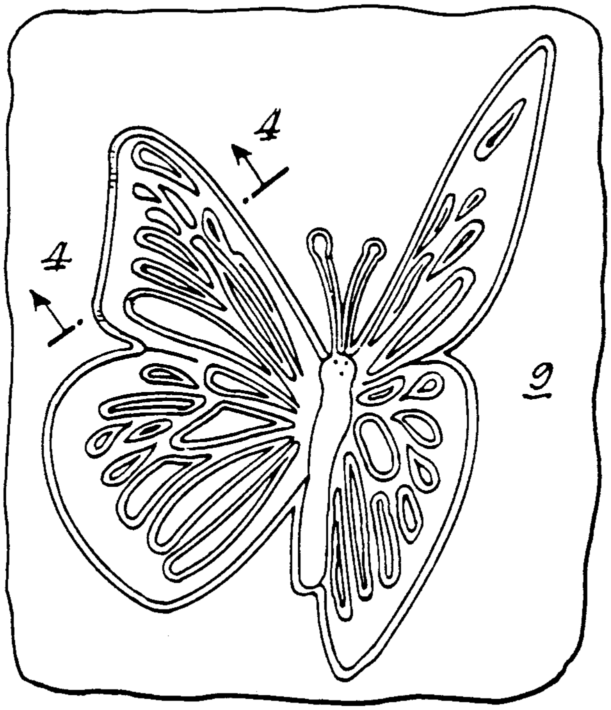
FIG. 1.
FIG. 2.
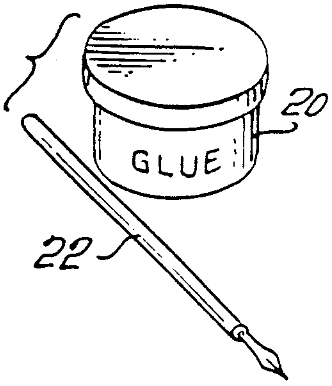
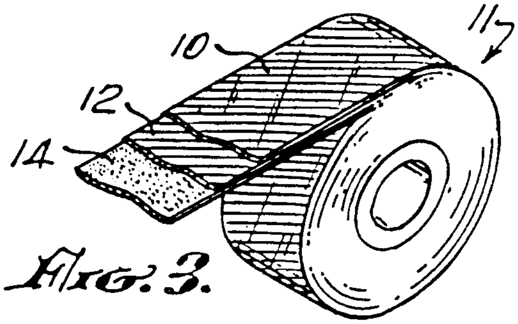
FIG. 3.
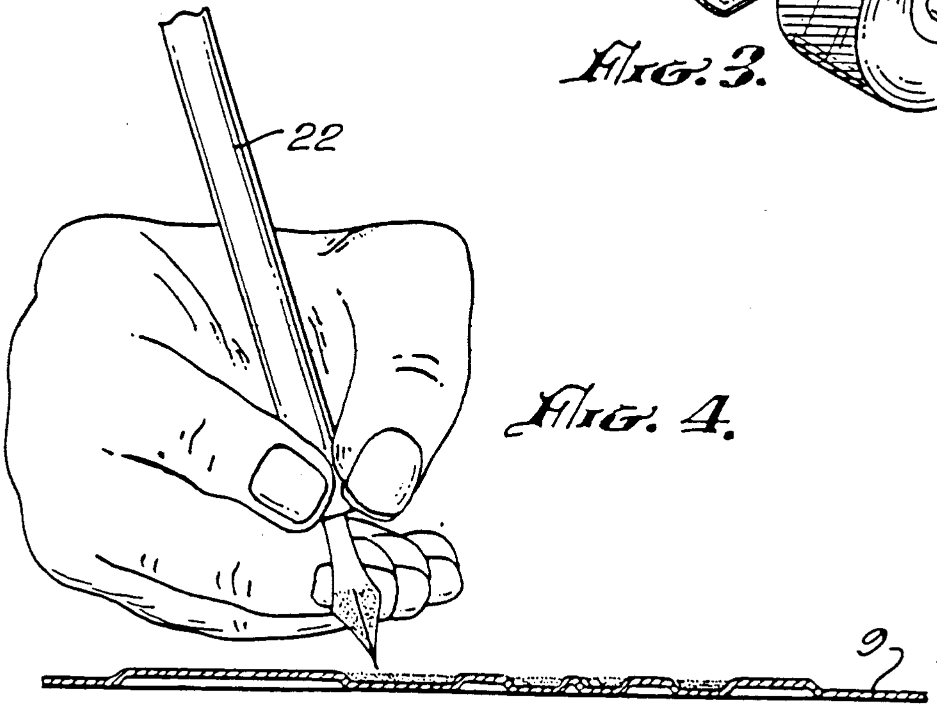
FIG. 4.

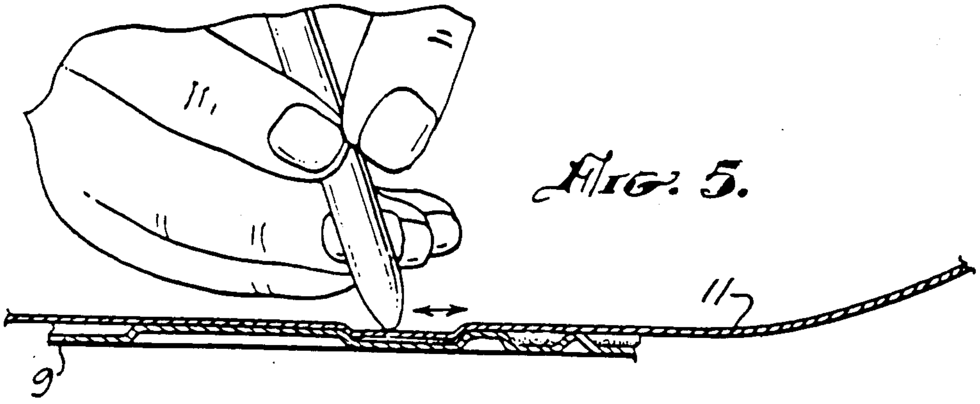
FIG. 5.
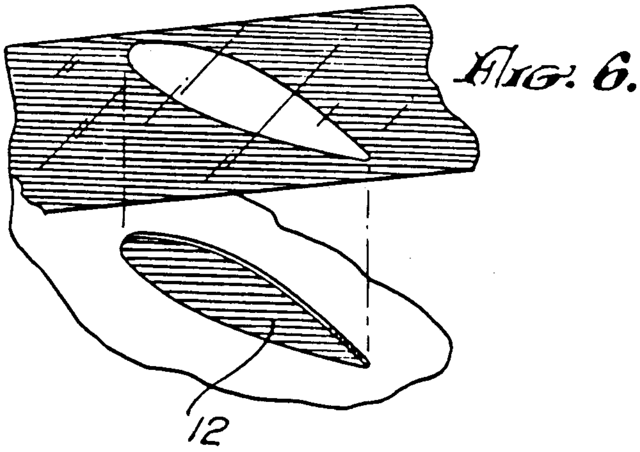
FIG. 6.
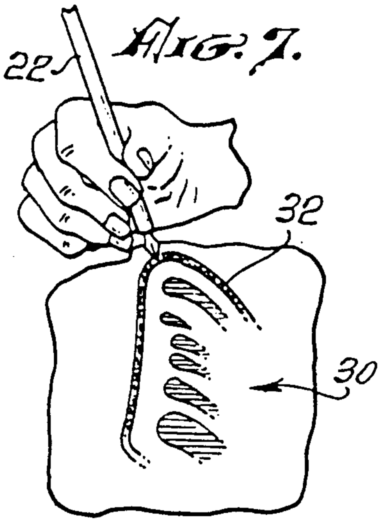
FIG. 7.
FIG. 9.
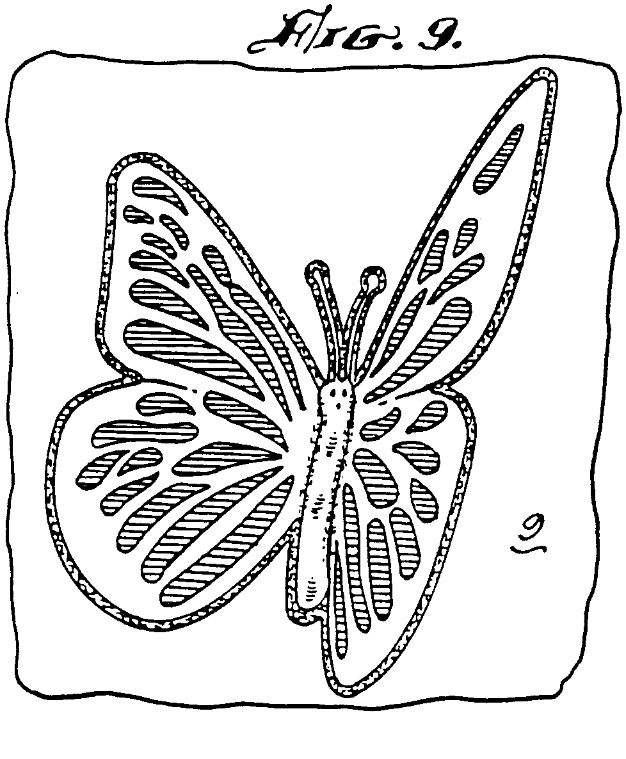
FIG. 8.
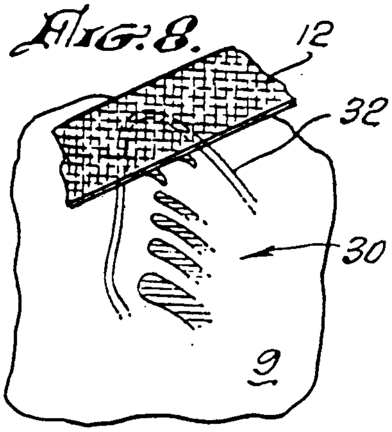

PROCESS OF PREPARING DECORATIVE MATERIAL UTILIZING TRANSFER PRINT FOILS

This is a continuation of copending application(s) Ser. No. 07/290,866 filed on Dec. 28, 1988, abandoned, which is a continuation of co-pending application Ser. No. 668,316 filed on 11/05/84, abandoned.

BACKGROUND OF THE INVENTION

1. Field of the Invention

The field of the invention is that of the graphic arts and particularly a process and/or art of producing or preparing decorative materials wherein graphics are prepared by way of applying distinctive coloration to desired particular areas of a surface, which may be paper, glass, plastic or otherwise.

2. Description of the Prior Art

With respect to the prior art, certain techniques have been known by which coloration or colored material has been applied to a surface. For example, having reference to a wooden picture frame, the following technique for applying gold leaf has been known. The surface of the frame is covered with Quick Size, which is a form of adhesive. The gold leaf is a commercially available article. The technique involves cutting it up into little squares making it easier to handle than otherwise. Then these little squares of gold leaf would be stuck onto the wooden frame so as to cover the surface to which the adhesive had been applied. This is a slow, tedious process, not at all having the capabilities of the process of the invention which is described hereinafter.

There is also a commercially known product which is known as a transfer print foil. This is a product which is commercially available in rolls having different colors. This product is a very thin, laminated product which in the commercial form has a very thin outer transparent mylar lamination. Underneath the mylar lamination is another lamination which is a colored, metallic film which may be of any of various colors with a form of adhesive in between the two films referred to. There is a further film on the inside of the metallic film as described which is a film which is a release coat which in the commercial utilization of the transfer print foil causes the metallic film to be adhered to the surface to which it is applied. The transfer print foil as described is readily available commercially, as well as descriptions of its formation, characteristics and typical manner of commercial usage. Typically, the transfer print foil as described is utilized in an apparatus which is a form of press with a steel plate which by way of the application of pressure and heat to the transfer print foil, images can be caused to transfer from the colored lamination to a surface.

The prior art techniques as described above do not provide the capability for an ordinary individual to produce decorative materials or graphics in a relatively simple way using known materials. This type of capability is lacking in the prior art and the herein invention provides a unique process or technique enabling an ordinary individual by applying only relatively ordinary skills to be able to produce highly decorative materials and graphics which are highly artistic and decorative in appearance.

SUMMARY OF THE INVENTION

The invention is a unique and simplified method of preparing or producing distinctive graphic designs or colorations on materials such as paper or otherwise.

The invention embodies a technique wherein areas to which coloration is to be applied are first delineated in the surface of the material such as, for example, by embossing, which produces raised areas and areas below the level of the raised areas so that the areas to which coloration is to be applied are delineated rather then embossing the areas which can be delineated simply by drawing them, sketching them or printing them.

Then the adhesive is applied directly to the delineated areas to which coloration is to be applied, and preferably this is done manually, using a quill. A form of adhesive is utilized which is allowed to dry so that it then becomes tacky. At this stage, the adhesive will not stick to the finger, but is sufficiently tacky so that the coloration can be transferred to it.

In practicing the invention, preferably a transfer print foil is utilized, which is commercially available. This foil is obtainable in rolls which may be of different colors. The transfer print foil is in the form of a thin material which is laminated. On the outside is a very thin lamination of clear plastic, that is, mylar. Underneath this lamination is a lamination of colored metallic material with typically an adhesive between these two films. Underneath the lamination of colored metallic material is a lamination which is in the form of a release coat or a sizing which permits release, that is, transfer to a substrate which may be the base material.

The adhesive that is preferably used in the material is a commercially available product which is known as "Quick-Size". This is a type of adhesive that can be allowed to dry so that it becomes tacky and so as to have the ability to cause the coloration that is transferred to adhere.

The adhesive is applied to the areas of the paper or other material in the delineated areas to which it is desired that the coloration be transferred. Then the section or part of the transfer print foil is simply laid over the delineated areas to which the adhesive has been applied. The print foil is merely manually pressed onto the tacky adhesive. Then the print foil is pulled off and the coloration of the colored metallic lamination transfers to the areas which have been coated with the adhesive. Different colors can be applied, the transfer print foil being obtainable in various different colors. Different colors can be applied to adjacent delineated areas so that the different colors cause the coloration to become iridescent, adding to the decorative quality of the product.

In light of the foregoing, the primary object of the invention is to make available a unique and simplified method of preparing or producing highly distinct and decorative graphic products using readily available materials.

A further object is to make available a method as in the foregoing utilizing commercially available transfer print foils which typically include a film or lamination of colored metallic material which transfers to the product being produced by way of being applied to delineated areas to which an adhesive has been applied.

A further object is to realize a method as in the foregoing utilizing commercially available transfer print foils which typically are in the form of a thin film having an outer lamination of clear plastic, such as mylar; a thin lamination of metallic material which is held to the outer lamination by adhesive, and an inner lamination which permits the transfer of the coloration of the metallic film to the product.

Further objects and additional advantages of the invention will become apparent from the following detailed description and annexed drawings.

BRIEF DESCRIPTION OF THE DRAWINGS

FIG. 1 is a view of a design embossed into paper;

FIG. 2 is a view of the adhesive container and quill;

FIG. 3 is a view of the roll of transfer print foil showing the laminations;

FIG. 4 is a pictorial view showing adhesive being applied to embossed surface, that is, surface that are adjacent to raised service;

FIG. 5 is a view illustrating the pressing down of the foil onto the adhesive areas;

FIG. 6 is a view showing the transfer of the colored metallic material away from the foil;

FIG. 7 is a pictorial view of a form of the invention illustrating the technique of applying coloration, that is, metallic film, to the border of a picture or onto a picture frame;

FIG. 8 is a pictorial view illustrating the foil being applied to the design as shown in FIG. 7 after application of the adhesive; and FIG. 9 is a view of a finished piece of artwork, which is a design having an outside border to which metallic coloration has been applied by the technique of the invention and metallic coloring has been applied to embossed areas.

DESCRIPTION OF A PREFERRED EMBODIMENT OF THE INVENTION AND METHOD OF PRACTICE

FIG. 1 of the drawings illustrates a part of a piece of material 9 which may be paper having a design embossed therein which is that of a butterfly having areas of different colors, and the embossment provides raised areas and areas at the same, that is, the original, level, as may be seen in the cross-sectional views of FIGS. 4 and 5. What the embossment does is to delineate areas in which it is desired to transfer coloration by the method. The areas to which it is desired to transfer coloration may be delineated in other ways. For example, the areas may be simply drawn in, sketched in, printed in or otherwise. The surface may be provided by materials other than paper.

The method in its preferred forms does not require or need great skill in performing it, but on the other hand makes it possible to produce extremely decorative designs by people with only normal skills. In a preferred form of the invention, a transfer print foil 11 is utilized which is commercially available. One form of the foil as shown in FIG. 3 is available from Transfer Print Foils, Inc., 9 Cotters Lane, East Brunswick, N.J. 08816. The transfer print foil is in a roll, and the foil is formed of very thin laminations, as illustrated in FIG. 3. The lamination on the outside, which is designated 10, is a very thin lamination of clear plastic, that is, mylar. This lamination is the film carrier. Numeral 12 designates a very thin lamination which is a lamination of colored metallic material, and this can be provided in various different colors. Normally, there is a sizing or adhesive in between the film, lamination 10 and lamination 12, not shown. Numeral 14 designates a further lamination which is a base or release coat, which permits the capability of quickly transferring material from the film 12, to a substrate.

Further materials utilized in the method or technique are illustrated in FIG. 2. Numeral 20 illustrates container of Quick-Size or adhesive. Adjacent to the container 20 is a quill 22 with which the adhesive is applied to the surface to which coloration is to be transferred, as will be described. The preferred form of adhesive which is used is a product which is known as "Quick-Size," which is obtainable from Madana Manufacturing Company, 7314 Melrose Avenue, Los Angeles, Calif. This is product is a form of adhesive that can be applied with the quill 22 to the desired areas. As described hereinafter, it is applied with the quill and then is allowed to dry sufficiently to become tacky. In the tacky state, it will not come off when touched with a finger, but is still sticky. In order to cause it to become sufficiently dry and tacky, an air blower may be used. This particular product is a vinyl acetate acrylic copolymer latex with water as the vehicle. This particular product has a pH of approximately 4.1. It is a self-reactive, cross-linking resin. As indicated above, this particular product is the preferred one for use in the practice of the method.

FIGS. 4, 5, 6 and 9 illustrate the practice of a preferred form of the method.

FIGS. 4 and 5 show the embossed sheet 9 in a cross-section. The embossment produces depressed areas and raised areas, the depressed areas being at the original level of the paper or other material which has been embossed. As may be seen in the design of FIGS. 1 and 9, areas are delineated in which it is desired that different colors or coloration be applied, such as gold and blue, as indicated in FIG. 9.

As illustrated in FIG. 4, the individual practicing the method holds the quill 22 as shown and dips into the adhesive in the container 20 and applies it to the depressed areas, as illustrated in FIG. 4. Using the quill, the operator or the individual applies the adhesive to the depressed areas, as shown in FIG. 4. The adhesive is then allowed to dry, so that although dry it remains tacky. A hair blower may be used if desired to hasten the drying of the adhesive.

The adhesive is applied liberally in larger areas. It can then be pulled by the quill in corner areas where foil is to be applied. After an initial blob is applied, the sizing is spread into the smaller areas. It is not permitted to streak. If it thins out, more is applied.

The sizing should be dry. The time element is usually about one-half hour. If the sizing is not dry enough, the foil will pick up the sizing and leave small colored indentations.

Then as illustrated in FIG. 5, when the adhesive is dry, the foil 11 is drawn out and laid over the areas to which the adhesive has been applied. The foil is then pressed down into the depressed areas where the adhesive is, and this may be done simply with the thumb pressing firmly in a rotary manner onto the sizing, as illustrated in FIG. 5. The foil needs to be held firmly with the other hand to keep from marring the foil. After the foil has been pressed down onto the adhesive in the depressed areas, it is simply pulled off. When this is done, the coloration of the colored metallic film 12 transfers directly to the substrate, that is, to the depressed areas in the embossment in material 9. When the foil is lifted, the coloration of the film 12 will transfer onto the depressed areas of the embossment, that is, where the sizing (adhesive) has been applied, so that those areas will have the color of the particular metallic film in the roll of foil that is used. Thus, it is to be seen that the commercially available transfer print roll can be used directly as it is obtained in the method as described.

FIG. 9 illustrates that a different coloration can be applied to different areas, as shown in FIG. 4, where the adhesive has been applied. That is, for example, a gold metallic coloration may be applied to some areas and blue to other areas. Where the edges of these colorations mix or join each other, they become iridescent, which of course adds to the decorative quality of the final product.

For the iridescent effect, the foil is placed, held firmly on both sides, and tapped lightly to transfer a desired color. Then a film having the second color is applied just as described above. The two colors produce the iridescence. A clear acrylic spray, such as, for example, Krylon, can be applied to the surface of the base material before applying adhesive. This provides a smoother working surface finish.

FIGS. 7 and 8 illustrate a variation in the method which is adapted, for example, to the application of coloration to the frame of a picture. Numeral 30 designates a picture or other material having a frame or a border 32 to which it is desired to apply a desired coloration. In executing the method in this application, the adhesive from the container 20 is applied by the quill 22 to the border or frame, as designated at 32. Again, the adhesive is allowed to dry sufficiently to become tacky, having been applied with the quill as shown. Then, the foil, being one having a metallic film of the desired coloration such as gold, is laid over the complete border or frame area 32 to which the adhesive has been applied. This is illustrated in FIG. 8, the foil as shown being one in which the metallic film 12 is of a gold color. After applying the foil, it is simply lifted as described in the foregoing and the gold coloration transfers directly from the transfer print foil to the areas to which the adhesive 32 has been applied. The result is that the complete border or frame can have the desired coloration applied to it throughout its extent. Before applying the adhesive to the frame, it can be painted with a colored paint, such as red, which provides a smoother finish to the surface. After applying the foil, the frame can be sprayed with Krylon as described above.

From the foregoing, those skilled in the art will readily recognize and appreciate the nature of the method and the manner of its execution. It will be appreciated that the method can be practiced using readily available commercial materials which normally are not used for a purpose or in a method as described herein. The uniqueness of the method enables the user to practice the method using the readily available materials and merely manipulating in the manner described to cause the coloration to transfer to the desired areas. The result is that very distinct and highly artistic and decorative graphic products can be realized.

The foregoing disclosure is representative of preferred forms of the method or technique of the invention and is intended to be illustrative rather than limiting, the invention to be accorded the full scope of the claims appended hereto.

What is claimed is:

1. A process for decorating a surface with a metallic foil, said process comprising:

applying a liquid adhesive of the type which dries to a delayed tack adhesive directly on a surface to be decorated;

drying said liquid adhesive to an extent sufficient to provide a tacky surface in a predetermined shape;

providing transfer print foils having a metallic layer side;

placing the metallic side of a transfer print foil of a first color over said tacky surface and tapping lightly the foil to transfer a portion of the foil to the tacky surface;

pressing the metallic side of a transfer print foil of a second color against the tacky surface, said metallic side of said transfer print foil of a second color being larger than said tacky surface and the transferred portion of the first color foil; and removing the transfer print foil of a second color from contact with the tacky surface thereby transferring only a portion of the foil of the second color to that portion of the tacky surface not covered by the foil of the first color and providing an iridescent foil portion in the shape of said tacky surface on the surface.

* * * * *